(12) United States Patent
Chen et al.

(10) Patent No.: US 8,701,886 B2
(45) Date of Patent: Apr. 22, 2014

(54) LCD PANEL PACKAGING BOX AND MANUFACTURING METHOD THEREOF

(75) Inventors: Shih Hsiang Chen, Guandong (CN); Yi-cheng Kuo, Guandong (CN); Jiahe Cheng, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 24 days.

(21) Appl. No.: 13/575,947

(22) PCT Filed: Jul. 10, 2012

(86) PCT No.: PCT/CN2012/078416
§ 371 (c)(1),
(2), (4) Date: Jul. 28, 2012

(87) PCT Pub. No.: WO2014/005344
PCT Pub. Date: Jan. 9, 2014

(65) Prior Publication Data
US 2014/0008267 A1    Jan. 9, 2014

(30) Foreign Application Priority Data
Jul. 4, 2012    (CN) .......................... 2012 1 0229772

(51) Int. Cl.
*B65D 85/48* (2006.01)
*G03B 42/04* (2006.01)

(52) U.S. Cl.
USPC .......................................... 206/454; 378/187

(58) Field of Classification Search
USPC ................ 206/449, 453, 454, 586–594, 521; 378/182–187
See application file for complete search history.

(56) References Cited

U.S. PATENT DOCUMENTS

| 1,489,943 | A | * | 4/1924 | Jeffries | 206/454 |
| 3,172,132 | A | * | 3/1965 | Mucha | 206/449 |
| 3,511,990 | A | * | 5/1970 | Hauss | 378/187 |
| 4,063,102 | A | * | 12/1977 | Ronci et al. | 378/187 |
| 4,763,789 | A | * | 8/1988 | Questel et al. | 206/454 |
| 4,892,193 | A | * | 1/1990 | Thomas | 206/453 |
| 5,097,953 | A | * | 3/1992 | Gingras | 206/454 |
| 5,912,944 | A | * | 6/1999 | Budinski et al. | 378/182 |

* cited by examiner

*Primary Examiner* — Bryon Gehman
(74) *Attorney, Agent, or Firm* — Andrew C. Cheng

(57) ABSTRACT

The present invention teaches a packaging box and a related manufacturing method. The packaging box contains a top cover and a bottom cover. The top cover is an assembly of a first member and a second member embedded in a first indentation of the first member. The first member directly supports the packaged objects and has a better buffering capability than that of the second member. The bottom cover is an assembly of a third member and a fourth member embedded in a second indentation of the third member. The third member directly supports the packaged objects and has a better buffering capability than that of the fourth member. As such, the present invention can effectively reduce the material cost as well as product cost for the packaging box.

18 Claims, 4 Drawing Sheets placing the materials for making a top cover and a bottom cover in appropriate molds, wherein The materials for making the top cover include the materials for making a first member and a second member; the materials for making the bottom cover include the materials for making a third member and a fourth members; the materials for making the first and third members directly support a packaged object; the material for the first member is configured with at least a first indentation on a side that is away from the packaged object; the material for the second member is shaped to match the first indentation and is placed in the first indentation; the material for the third member is configured with at least a second indentation on a side that is away from the packaged object; the material for the fourth member is shaped to match the second indentation and is placed in the second indentation; the materials for the first and second members have first and second buffering capabilities, respectively, and the first buffering capability is better than the second buffering capability; the materials for the third and fourth members have third and fourth buffering capabilities, respectively, and the third buffering capability is better than the fourth buffering capability.   — S401 hot-pressing the materials for the first, second, third, and fourth members so that the materials for the second and fourth members are positioned in the materials for the first and third members, respectively.   — S402

LCD PANEL PACKAGING BOX AND MANUFACTURING METHOD THEREOF

BACKGROUND OF THE INVENTION

1. Field of the Invention

The present invention relates to the field of packaging, and in particular to a packaging box and a related manufacturing method for the packaging box.

2. The Related Arts

Currently liquid crystal displays (LCDs) are manufactured in the following steps.

An initial array process involved the manufacturing of array substrates and color filter substrates.

An intermediate cell process involved stacking an array substrate and a color filter substrate, filling and sealing liquid crystal between the two substrates, and cutting the stacked substrate into a number of LCD panels.

A final module process involved the assembly of each LCD panel with other components such as backlight plate, circuit, frame, etc.

After the intermediate cell process, the numerous produced LCD panels have to be packaged and delivered to the plant for the final module process.

A conventional packaging box 10 for the produced LCD panels, as shown in FIG. 1, has a number of buffering objects 11 and LCD panels 12 alternately stacked inside. Usually, the packaging box 10 is made of a plastic material that has a specific hardness and buffering capability such as PP (polypropylene). However, PP is an expensive material and is not a good choice for product cost reduction.

SUMMARY OF THE INVENTION

The technical issue addressed by the present invention is to provide a packaging box and a related manufacturing method for the packaging box so as to effectively reduce the material cost as well as the product cost.

To resolve the technical issue, the present invention provides a packaging box containing a top cover and a bottom cover. The top cover contains a first member and a second member. The first member directly supports the packaged objects and has a first indentation on a top side away from the packaged object. Along at least a circumferential side and on a bottom side of the first indentation, a first flange and at least a third indentation are configured, respectively. The second member is shaped in accordance with the first indentation. Correspondingly, along at least a circumferential side and on a bottom side of the second member, a first step and at least a third bulge are configured, respectively. Each first step matches a corresponding first flange, and each third bulge matches a corresponding third indentation, so that the second member is embedded reliably in the first indentation.

The first and second members have a first buffering capability and a second buffering capability, respectively, and the first buffering capability is greater than the second buffering capability. The bottom cover contains a third member and a fourth member. The third member directly supports the packaged objects and has a second indentation on a bottom side away from the packaged objects. Along at least a circumferential side and on a top side of the second indentation, a second flange and at least a fourth indentation are configured, respectively. The fourth member is shaped in accordance with the second indentation. Correspondingly, along at least a circumferential side and on a top side of the fourth member, a second step and at least a fourth bulge are configured, respectively. Each second step matches a corresponding second flange, and each fourth bulge matches a corresponding fourth indentation, so that the fourth member is embedded reliably in the second indentation.

The third and fourth members have a third buffering capability and a fourth buffering capability, respectively, and the third buffering capability is greater than the fourth buffering capability.

In a preferred embodiment, there are two first flanges on two circumferential sides of the first indentation, respectively. There are two first steps on two circumferential sides of the second member, respectively, positioned correspondingly to the two first flanges. There are two second flanges on two circumferential sides of the second indentation, respectively. There are two second steps on two circumferential sides of the fourth member, respectively, positioned correspondingly to the two second flanges.

The numbers of the third and fourth indentations, and the numbers of the third and fourth bulges are at least one.

The numbers of the second member, the first indentation, the fourth member, and the second indentation are at least one.

In a preferred embodiment, the first and third members are made of expanded polypropylene (EPP).

In a preferred embodiment, the second and fourth members are made of acrylonitrile butadiene styrene (ABS) or polyethylene (PE).

To resolve the technical issue, the present invention provides another packaging box containing a top cover and a bottom cover. The top cover contains a first member and a second member. The first member directly supports the packaged objects and has a first indentation on a top side away from the packaged object. The second member is shaped in accordance with the first indentation and the second member is embedded in the first indentation.

The first and second members have a first buffering capability and a second buffering capability, respectively, and the first buffering capability is greater than the second buffering capability. The bottom cover contains a third member and a fourth member. The third member directly supports the packaged objects and has a second indentation on a bottom side away from the packaged objects. The fourth member is shaped in accordance with the second indentation and the fourth member is embedded in the second indentation.

The third and fourth members have a third buffering capability and a fourth buffering capability, respectively, and the third buffering capability is greater than the fourth buffering capability.

Along at least a circumferential side of the first member, a first flange is configured and, correspondingly along at least a circumferential side of the second member, a first step is configured. Each first step matches a corresponding first flange so that, when the packaging box is laid flatly on a surface, the second member is reliably positioned in the first indentation. Along at least a circumferential side of the second member, a second flange is configured and, correspondingly, along at least a circumferential side of the fourth member, a second step is configured. Each second step matches a corresponding second flange so that, when the packaging box is laid flatly on a surface, the fourth member is reliably positioned in the second indentation.

In a preferred embodiment, there are two first flanges on two circumferential sides of the first indentation, respectively. There are two first steps on two circumferential sides of the second member, respectively, positioned correspondingly to the two first flanges. There are two second flanges on two circumferential sides of the second indentation, respectively.

There are two second steps on two circumferential sides of the fourth member, respectively, positioned correspondingly to the two second flanges.

At least a third indentation is configured on a bottom side of the first indentation and, on a bottom side of the second member, at least a third bulge is configured and positioned correspondingly to a third indentation. Each third bulge matches a corresponding third indentation so that, when the packaging box stands on one of its lateral sides, the second member is reliably positioned in the first indentation. At least a fourth indentation is configured on a top side of the second indentation and, on a top side of the fourth member, at least a fourth bulge is configured and positioned correspondingly to a fourth indentation. Each fourth bulge matches a corresponding fourth indentation so that, when the packaging box stands on one of its lateral sides, the fourth member is reliably positioned in the second indentation.

The numbers of the third and fourth indentations, and the numbers of the third and fourth bulges are at least one.

The numbers of the second member, the first indentation, the fourth member, and the second indentation are at least one.

In a preferred embodiment, the first and third members are made of EPP.

In a preferred embodiment, the second and fourth members are made of ABS or PE.

The packaging box is for accommodating LCD panels as the packaged objects.

To resolve the technical issue, the present invention provides a manufacturing method for the packaging box which contains the following steps. Initially, the materials for making the top and bottom covers are positioned in appropriate molds. The materials for making the top cover include the materials for making the first and second members. The materials for making the bottom cover include the materials for making the third and fourth members. The materials for making the first and third members directly support the packaged objects. The material for the first member is configured with at least a first indentation on a side that is away from the packaged objects. The material for the second member is shaped to match the first indentation and is placed in the first indentation. The material for the third member is configured with at least a second indentation on a side that is away from the packaged objects. The material for the fourth member is shaped to match the second indentation and is placed in the second indentation.

The materials for the first and second members have first and second buffering capabilities, respectively, and the first buffering capability is greater than the second buffering capability. The materials for the third and fourth members have third and fourth buffering capabilities, respectively, and the third buffering capability is greater than the fourth buffering capability. The materials for the third and fourth members have third and fourth buffering capabilities, respectively, and the third buffering capability is better than the fourth buffering capability. Subsequently, the materials for the first, second, third, and fourth members are hot-pressed so that the materials for the second and fourth members are positioned in the materials for the first and third members, respectively.

In a preferred embodiment, the first and third members are made of EPP.

In a preferred embodiment, the second and fourth members are made of ABS or PE.

The benefit of the present invention is as follows. Unlike the prior art having an integral top cover, the present invention designs the top cover as an assembly of a first member and at least a second member. The first member having a superior buffering capability directly supports the packaged objects, and the second member having an ordinary buffering capability is embedded in the first indentation of the first member to support the packaged objects indirectly. Unlike the prior art having an integral bottom cover, the present invention designs the bottom cover as an assembly of a third member and at least a fourth member. The third member having a superior buffering capability directly supports the packaged objects, and the fourth member having an ordinary buffering capability is embedded in the second indentation of the third member to support the packaged objects indirectly. The second and fourth members can be made of a less expensive material so as to reduce the material cost as well as the product cost.

The bottom cover is designed also as an assembly of a third member and at least a fourth member. Each second member is embedded in a first indentation of the first member, and each fourth member is embedded in a second indentation of the third member. The first and third members that directly support the packaged objects are made of a material of superior buffering capability whereas the second the fourth members that do not directly support the packaged objects are made of an ordinary buffering capability. As such, the third and fourth members are less expensive, thereby reducing the material cost as well as the product cost of the packaging box.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings:

FIG. 7 is a flow diagram showing the steps of manufacturing a packaging box according to the present invention.

DETAILED DESCRIPTION OF THE PREFERRED EMBODIMENTS

Figure 1:
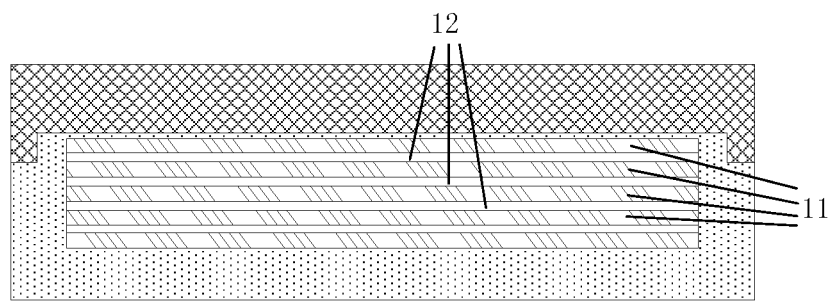
FIG. 1 is a sectional diagram showing a conventional packaging box.
Figure 2:
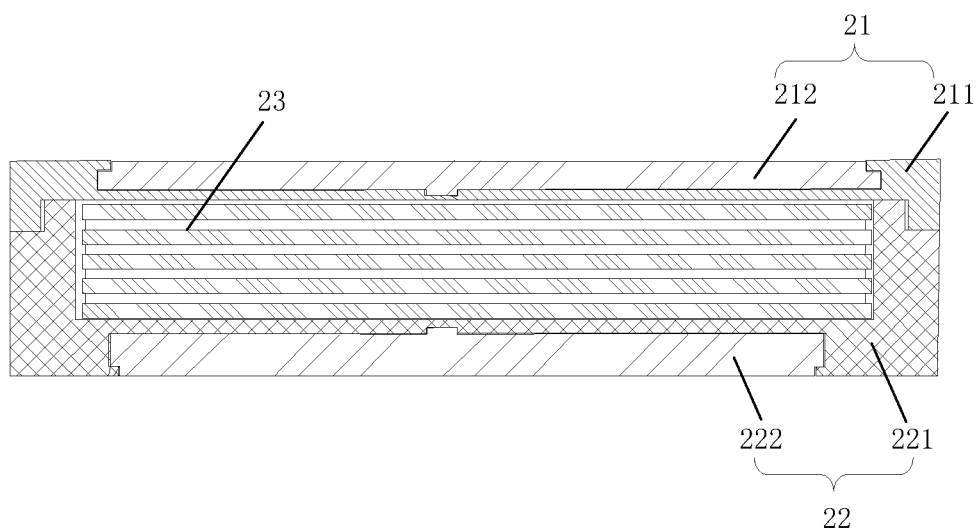
FIG. 2 is a sectional diagram showing a packaging box according to an embodiment of the present invention.
Figure 3:
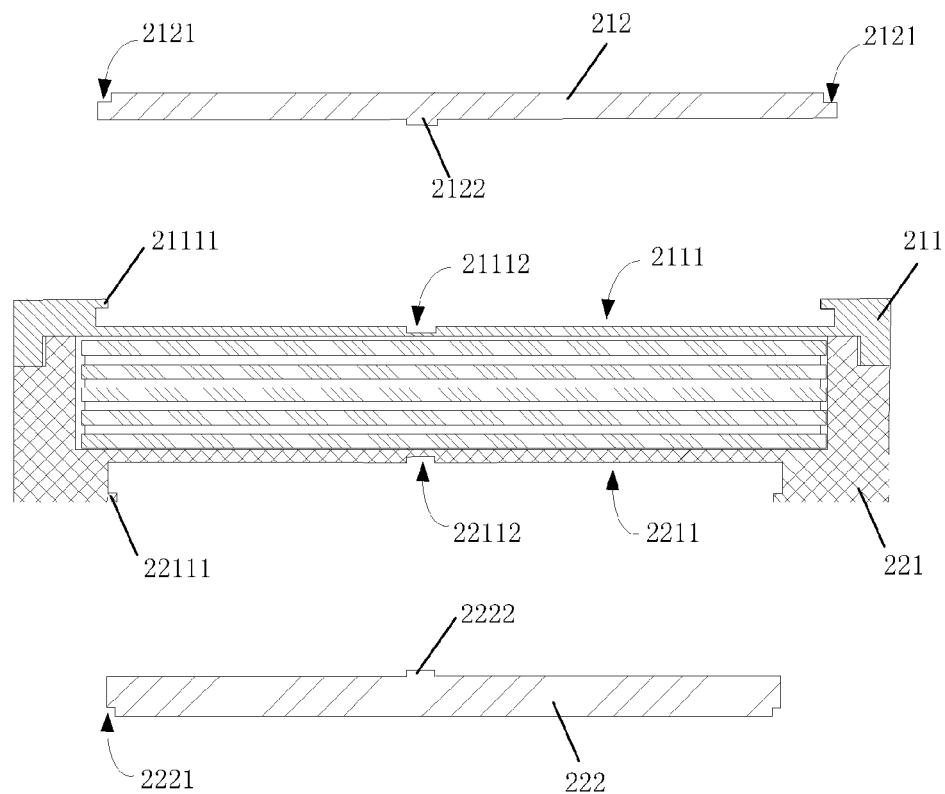
FIG. 3 is a sectional break-down diagram showing the packaging box of FIG. 2.
Figure 4:
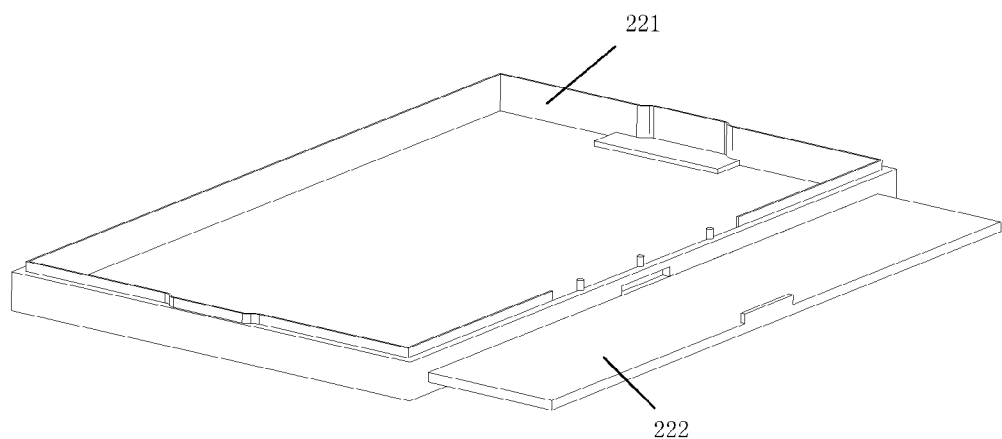
FIG. 4 is a perspective diagram showing a bottom cover of the packaging box of FIG. 2.

FIG. 2 is a sectional diagram showing a packaging box 20 according to an embodiment of the present invention. FIG. 3 is a sectional break-down diagram showing the packaging box 20 of FIG. 2. FIG. 4 is a perspective diagram showing a bottom cover of the packaging box 20 of FIG. 2. As illustrated in FIGS. 2, 3, and 4, the packaging box 20 contains a top cover 21 and a bottom cover 22. The top cover 21 contains a first member 211 and a second member 212. The bottom cover 22 contains a third member 221 and a fourth member 222.

The first member 211 directly supports the packaged objects 23. The first member 211 has a first buffer capability by being made of a material having superior buffering capability such as EPP (expanded polypropylene). The first member 211 has a first indentation 2111 on a top side that is away from the packaged objects 23. Along at least a circumferential side of the first indentation 2111, the first member 211 is configured with a first flange 21111. At least a third indentation 21112 is configured on a bottom side of the first indentation 2111. The second member 212 is shaped in accordance with the first indentation 2111 so that the second member 212 can be embedded in the first indentation 2111. Correspondingly, along at least a circumferential side of the second member 212, a first step 2121 is configured to match a corresponding first flange 21111. As such, when the packaging box 20 is laid flatly on a surface, the second member 212 is reliably positioned in the first indentation 2111. Preferably, there are two first flanges 21111 on two circumferential sides of the first indentation 2111, respectively. Preferably, there are two first steps 2121 on two circumferential sides of the second member 212, respectively, positioned correspondingly to the two first flanges 21111. On a bottom side of the second member 212, at least a third bulge 2122 is configured and positioned correspondingly to a third indentation 21112. The third bulge 2122 matches the third indentation 21112. As such, when the packaging box 20 stands on one of its lateral sides, the second member 212 is reliably positioned in the first indentation 2111. There can be more than one third indentation 21112 and one third bulge 2122, with each third indentation 21112 corresponding to one third bulge 2122.

In the present embodiment, the second member 212 does not directly support the packaged objects 23 and has a second buffering capability from being made of a plastic material of ordinary buffering capability and as such less expensive such as acrylonitrile butadiene styrene (ABS), polyethylene (PE), etc.

The third member 221 of the bottom cover 22 directly supports the packaged objects 23. The third member 221 has a third buffer capability by being made of a material having superior buffering capability such as EPP. The third member 221 has a second indentation 2211 on a bottom side that is away from the packaged objects 23. Along at least a circumferential side of the second indentation 2211, the third member 221 is configured with a second flange 22111. At least a fourth indentation 22112 is configured on a top side of the second indentation 2211. The fourth member 222 is shaped in accordance with the second indentation 2211 so that the fourth member 222 can be embedded in the second indentation 2211. Correspondingly, along at least a circumferential side of the fourth member 222, a second step 2221 is configured to match a corresponding second flange 22111. As such, when the packaging box 20 is laid flatly on a surface, the fourth member 222 is reliably positioned in the second indentation 2211. Preferably, there are two second flanges 22111 on two circumferential sides of the second indentation 2211, respectively. Preferably, there are two second steps 2221 on two circumferential sides of the fourth member 222, respectively, positioned correspondingly to the two second flanges 22111. On a top side of the fourth member 222, at least a fourth bulge 2222 is configured and positioned correspondingly to a fourth indentation 22112. The fourth bulge 2222 matches the fourth indentation 22112. As such, when the packaging box 20 stands on one of its lateral sides, the fourth member 222 is reliably positioned in the second indentation 2211. There can be more than one fourth indentation 22112 and one fourth bulge 2222, with each fourth indentation 22112 corresponding to one fourth bulge 2222. In the present embodiment, the fourth member 222 does not directly support the packaged objects 23 and has a fourth buffering capability from being made of a plastic material of ordinary buffering capability and as such less expensive such as ABS, PE, etc.

Please note that a material of superior buffering capability is more expensive than another material of ordinary buffering capability.

In the present embodiment, the first buffering capability of the first member 211 directly supporting the packaged objects 23 is greater than the second buffering capability of the second member 212. The second member 212 therefore can be made of a less expensive material than that of the first member 211.

Similarly, the third buffering capability of the third member 221 directly supporting the packaged objects 23 is greater than the fourth buffering capability of the fourth member 222. The fourth member 222 therefore can be made of a less expensive material than that of the third member 221.

Figure 5:
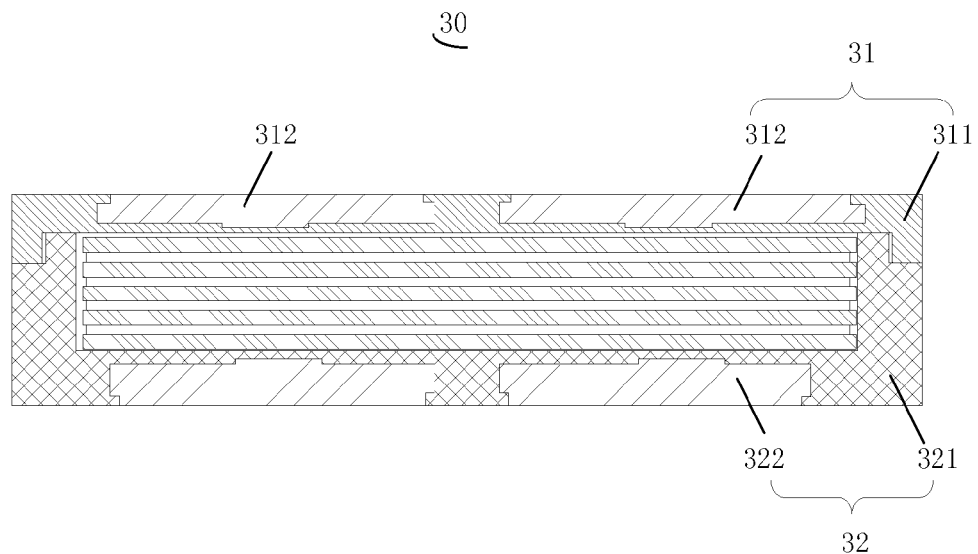
FIG. 5 is a sectional diagram showing a packaging box according to another embodiment of the present invention.
Figure 6:
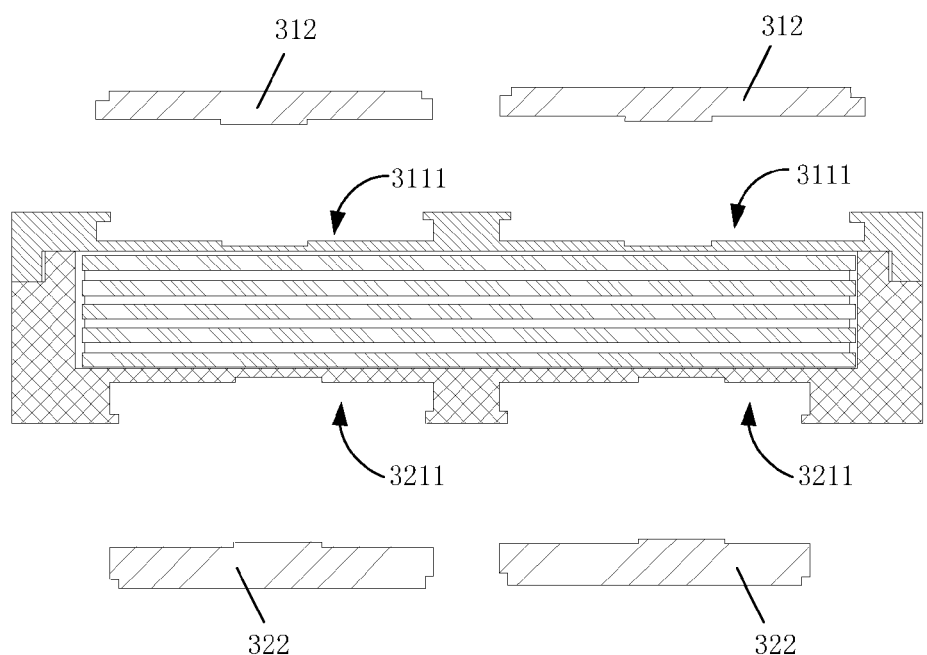
FIG. 6 is a sectional break-down diagram showing the packaging box of FIG. 5.

FIG. 5 is a sectional diagram showing a packaging box 30 according to another embodiment of the present invention. FIG. 6 is a sectional break-down diagram showing the packaging box 30 of FIG. 5. As illustrated, the packaging box 30 contains a top cover 31 and a bottom cover 32. The top cover 31 contains a first member 311 and at least a second member 312. The first member 311 has at least a first indentation 3111 on a top side and each second member 312 is embedded in a first indentation 3111. In the present embodiment, the number of the first indentations 3111 and the second members 312 is two. However, the number is not limited to two. The bottom cover 32 contains a third member 321 and at least a fourth member 222. The third member 321 has at least a second indentation 3211 on a bottom side and each fourth member 322 is embedded in a second indentation 3211. In the present embodiment, the number of the second indentations 3211 and the fourth members 322 is two. However, the number is not limited to two. Additionally, the packaging box 20 or 30 can be used to package LCD panels as the packaged objects 23. Of course, the packaged objects 23 are not limited to LCD panels.

According to the present invention, the top cover of the packaging box is designed as an assembly of a first member and at least a second member. The bottom cover is designed also as an assembly of a third member and at least a fourth member. Each second member is embedded in a first indentation of the first member, and each fourth member is embedded in a second indentation of the third member. The first and third members that directly support the packaged objects are made of a material of superior buffering capability whereas the second and fourth members that do not directly support the packaged objects are made of an ordinary buffering capability. As such, the third and fourth members are less expensive, thereby reducing the material cost as well as the product cost of the packaging box.

The present invention also teaches a manufacturing method for the packaging box, whose steps are depicted in a flow diagram of FIG. 7. As illustrated, the method contains the following steps.

In the step S401, the materials for making the top and bottom covers are positioned in appropriate molds.

The materials for making the top cover include the materials for making the first and second members. The materials for making the bottom cover include the material for making the third and fourth members. The materials for making the first and third members directly support the packaged objects. The material for the first member is configured with at least a first indentation on a side that is away from the packaged objects. The material for the second member is shaped to match the first indentation and is placed in the first indentation. The material for the third member is configured with at least a second indentation on a side that is away from the packaged objects. The material for the fourth member is shaped to match the second indentation and is placed in the second indentation. The materials for the first and second members have first and second buffering capabilities, respectively, whereas the materials for the third and fourth members have third and fourth buffering capabilities, respectively.

A mold is a tool for forming objects and provides an original model for the objects. A material is more expensive if it has a greater buffering capability. According to the invention, the materials for the second and fourth members are less expensive than those for the first and third members.

EPP can be used for the first and third members whereas ABS or PE can be used for the second and fourth members.

In the step S402, the materials for the first, second, third, and fourth members are hot-pressed so that the materials for the second and fourth members are positioned in the materials for the first and third members.

Hot-pressing is about positioning material by pressure in a heated mold. Then, by controlling the material's melting temperature and duration, the material is melted, solidified, cooled, and a formed object is obtained by removing the material from the mold.

In this step, the materials for the first, second, third, and fourth members are placed in molds and hot-pressed so that the material for the second member is positioned in the first indentation of the material for the first member, and the material for the fourth member is positioned in the second indentation of the material for the third member. The materials for the second and fourth members do not directly support the packaged object and can be less expensive materials so as to reduce material cost as well as product cost.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A packaging box, which comprises a top cover and a bottom cover, wherein the top cover comprises:
    a first member directly supporting a packaged object, the first member having a first indentation on a top side of the first member away from the packaged object, the first indentation having a first flange along at least a circumferential side of the first indentation, and at least a third indentation on a bottom side of the first indentation; and
    a second member shaped in accordance with the first indentation, the second member having a first step along at least a circumferential side of the second member, and at least a third bulge on a bottom side of the second member, each first step matching a corresponding first flange, and each third bulge matching a corresponding third indentation, so that the second member is embedded reliably in the first indentation;
    wherein the first and second members have a first buffering capability and a second buffering capability, respectively, and the first buffering capability is greater than the second buffering capability;
    wherein the bottom cover comprises:
    a third member directly supporting a packaged object and having a second indentation on a bottom side of the third member away from the packaged object, the second indentation having a second flange along at least a circumferential side of the second indentation, and at least a fourth indentation on a top side of the second indentation; and
    a fourth member shaped in accordance with the second indentation, the fourth member having a second step along at least a circumferential side of the fourth member, and at least a fourth bulge on a top side of the fourth member, each second step matches a corresponding second flange, and each fourth bulge matches a corresponding fourth indentation, so that the fourth member is embedded reliably in the second indentation; and
    wherein the third and fourth members have a third buffering capability and a fourth buffering capability, respectively, and the third buffering capability is greater than the fourth buffering capability.

2. The packaging box as claimed in claim 1, wherein
    there are two first flanges on two circumferential sides of the first indentation, respectively;
    there are two first steps on two circumferential sides of the second member, respectively, positioned correspondingly to the two first flanges;
    there are two second flanges on two circumferential sides of the second indentation, respectively; and
    there are two second steps on two circumferential sides of the fourth member, respectively, positioned correspondingly to the two second flanges.

3. The packaging box as claimed in claim 1, wherein there are at least one third indentation, at least one fourth indentation, at least one third bulges, and at least one fourth bulge.

4. The packaging box as claimed in claim 1, wherein the second member, the first indentation, the fourth member, and the second indentation are each at least one in number.

5. The packaging box as claimed in claim 1, wherein the first and third members are made of expanded polypropylene (EPP).

6. The packaging box as claimed in claim 1, wherein the second and fourth members are made of acrylonitrile butadiene styrene (ABS) or polyethylene (PE).

7. A packaging box, which comprises a top cover and a bottom cover, wherein the top cover comprises:
    a first member directly supporting a packaged object, the first member having a first indentation on a top side of the first member away from the packaged object; and
    a second member shaped in accordance with the first indentation and embedded in the first indentation;
    wherein the first and second members have a first buffering capability and a second buffering capability, respectively, and the first buffering capability is greater than the second buffering capability;
    wherein the bottom cover comprises:
    a third member directly supporting a packaged object and having a second indentation on a bottom side of the third member; and
    a fourth member shaped in accordance with the second indentation and embedded in the second indentation; and
    wherein the third and fourth members have a third buffering capability and a fourth buffering capability, respectively, and the third buffering capability is greater than the fourth buffering capability.

8. The packaging box as claimed in claim 7, wherein
    the first member has a first flange along at least a circumferential side of the first member, the second member has a first step along at least a circumferential side of the second member, each first step matches a corresponding first flange so that, when the packaging box is laid flatly on a surface, the second member is reliably positioned in the first indentation; and
    the second member has a second flange along at least a circumferential side of the second member, the fourth member has a second step along at least a circumferential side of the fourth member, each second step matches a corresponding second flange so that, when the packaging box is laid flatly on a surface, the fourth member is reliably positioned in the second indentation.

9. The packaging box as claimed in claim 8, wherein
there are two first flanges on two circumferential sides of the first indentation, respectively;
there are two first steps on two circumferential sides of the second member, respectively, positioned correspondingly to the two first flanges;
there are two second flanges on two circumferential sides of the second indentation, respectively; and
there are two second steps on two circumferential sides of the fourth member, respectively, positioned correspondingly to the two second flanges.

10. The packaging box as claimed in claim 7, wherein
at least a third indentation is configured on a bottom side of the first indentation and, on a bottom side of the second member, at least a third bulge is configured and positioned correspondingly to a third indentation, each third bulge matches a corresponding third indentation so that, when the packaging box stands on one of its lateral sides, the second member is reliably positioned in the first indentation; and
at least a fourth indentation is configured on a top side of the second indentation and, on a top side of the fourth member, at least a fourth bulge is configured and positioned correspondingly to a fourth indentation, each fourth bulge matches a corresponding fourth indentation so that, when the packaging box stands on one of its lateral sides, the fourth member is reliably positioned in the second indentation.

11. The packaging box as claimed in claim 10, wherein the third and fourth indentations, and the numbers of the third and fourth bulges are each at least one in number.

12. The packaging box as claimed in claim 7, wherein the second member, the first indentation, the fourth member, and the second indentation are each at least one in number.

13. The packaging box as claimed in claim 7, wherein the first and third members are made of expanded polypropylene (EPP).

14. The packaging box as claimed in claim 7, wherein the second and fourth members are made of acrylonitrile butadiene styrene (ABS) or polyethylene (PE).

15. The packaging box as claimed in claim 7, wherein the packaged object is a liquid crystal display (LCD) panel.

16. A manufacturing method of a packaging box, which comprises the steps of:
placing the materials for making a top cover and a bottom cover in appropriate molds, wherein the materials for making the top cover include the materials for making a first member and a second member; the materials for making the bottom cover include the materials for making a third member and a fourth member; the materials for making the first and third members directly support a packaged object; the material for the first member is configured with at least a first indentation on a side that is away from the packaged object; the material for the second member is shaped to match the first indentation and is placed in the first indentation; the material for the third member is configured with at least a second indentation on a side that is away from the packaged object; the material for the fourth member is shaped to match the second indentation and is placed in the second indentation; the materials for the first and second members have first and second buffering capabilities, respectively, and the first buffering capability is greater than the second buffering capability; the materials for the third and fourth members have third and fourth buffering capabilities, respectively, and the third buffering capability is greater than the fourth buffering capability; and
hot-pressing the materials for the first, second, third, and fourth members so that the materials for the second and fourth members are positioned in the materials for the first and third members, respectively.

17. The packaging box as claimed in claim 16, wherein the first and third members are made of expanded polypropylene (EPP).

18. The packaging box as claimed in claim 16, wherein the second and fourth members are made of acrylonitrile butadiene styrene (ABS) or polyethylene (PE).

* * * * *